United States Patent [19]
Phillips

[11] 3,940,151
[45] Feb. 24, 1976

[54] GLANDS

[75] Inventor: Reginald Andrew Phillips, Warrington, England

[73] Assignee: Dobson Park Industries Limited, England

[22] Filed: July 2, 1975

[21] Appl. No.: 592,457

[30] Foreign Application Priority Data
Dec. 18, 1974  United Kingdom............... 54572/74

[52] U.S. Cl.................. 277/27; 277/103; 92/165 R
[51] Int. Cl.².......................................... F16J 15/16
[58] Field of Search ........................... 92/165–168; 277/3, 27, 103, 102

[56] References Cited
UNITED STATES PATENTS

| | | | |
|---|---|---|---|
| 1,999,094 | 4/1935 | Godron | 277/27 |
| 2,025,279 | 12/1935 | Gilmam | 277/103 |
| 2,231,680 | 2/1941 | Pfauser | 277/103 |
| 2,666,659 | 1/1954 | Audemar | 277/103 |
| 2,720,267 | 10/1955 | Brown | 277/103 |
| 2,957,712 | 10/1960 | Farmer | 277/103 |
| 3,068,012 | 12/1962 | Van Vleet | 277/27 |
| 3,129,948 | 4/1964 | Kendall | 277/103 |
| 3,333,513 | 8/1967 | Wettstein | 92/165 R |
| 3,536,334 | 8/1970 | Kendall | 277/103 |
| 3,730,057 | 5/1973 | Friden | 92/168 |

*Primary Examiner*—Robert I. Smith
*Attorney, Agent, or Firm*—Brady, O'Boyle & Gates

[57] ABSTRACT

A gland seal arrangement for effecting a fluid seal between two relatively movable parts wherein the loading applied to an annular sealing member in contact with such parts is derived from a coaxially arranged, sleeve-like thrust member sensitive to the pressure of the fluid being sealed so that with increasing fluid pressure the loading applied to the sealing member is correspondingly increased.

10 Claims, 1 Drawing Figure

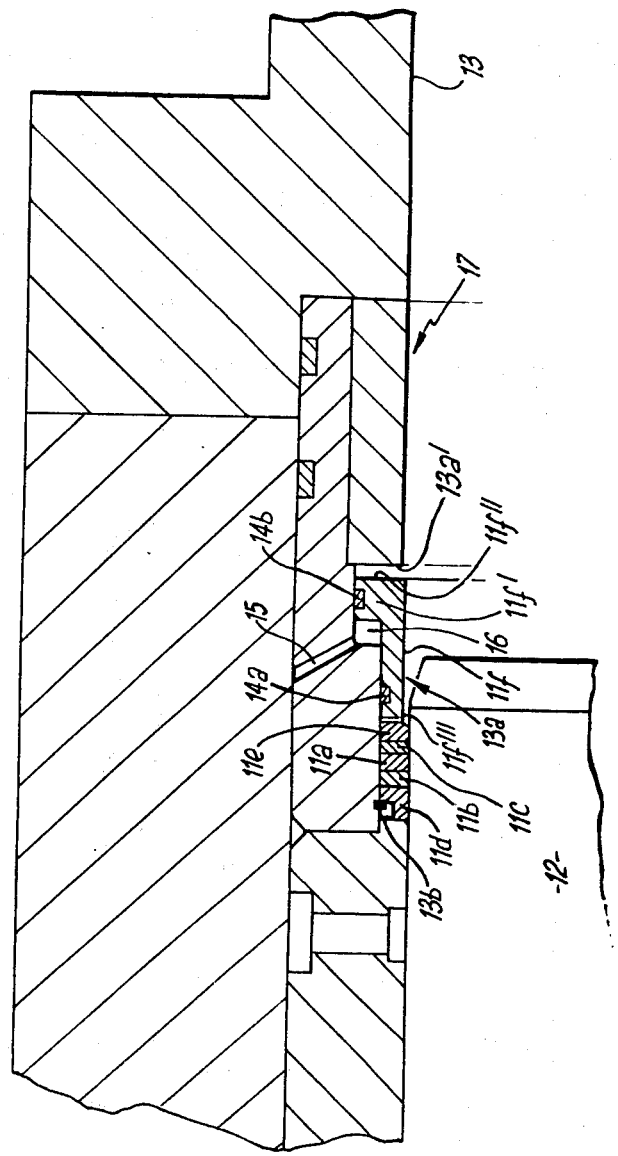

GLANDS

The present invention relates to gland seal arrangements for providing seals between relatively movable parts, more particularly parts which rotate and/or reciprocate one relative to the other.

One particular application of the invention is to a gland for a hammer piston of a pressure-fluid actuated tool of the kind described in our co-pending British Patent Application No. 39611/74.

According to the invention there is provided a gland seal arrangement for providing a fluid-tight seal between two relatively movable parts, the said arrangement comprising an annular sealing member for disposal between said parts in sealing contact therewith, the said member being axially locatable in one said part, and a thrust member arranged to act axially upon the said sealing member, the said thrust member having a face for exposure to the pressure of the fluid being sealed and being adapted, when subjected to such pressure, to urge the sealing member into such sealing contact.

The invention also includes a structure embodying a gland seal arrangement as aforesaid.

The invention will now be described further, by way of example only, with reference to the single FIGURE of the accompanying drawing illustrating, in axial section, one embodiment thereof as applied to a percussion tool of the kind disclosed in our British Patent No. 1,356,022.

Referring now to the drawing, a gland arrangement 11 for forming a seal between a piston 12 moving reciprocably within a cylinder 13 comprises a plurality of coaxially arranged annular parts 11a to 11e located in abutting face-to-face disposition within a peripheral groove 13a formed in the wall of the said cylinder, and a thrust member 11f bearing axially on the said superimposed parts 11a to 11e and sensitive to the fluid pressure within the cylinder 13, the member serving to urge the parts into mutual contact and the relevant ones thereof into sealing relationship with the surface of the piston 12 and the cylinder bore.

The plurality of parts consists of a sealing ring 11a interposed between two anti-extrusion rings 11b, 11c, a backing ring 11d outwardly of one ring 11b and a pressure ring 11e outwardly of the other ring 11c, the backing ring 11d abutting a seating 13b, at one end of the groove 13a to the cylinder and the pressure ring 11e receiving an end of the thrust member 11f into contact therewith. The thrust member 11f is of generally cylindrical form and that end thereof remote from the pressure ring 11e is provided with a radially outwardly directed flange 11f', the groove 13a being of stepped configuration, the body of the thrust member engaging the lesser diameter and the flange the greater diameter portions respectively of the said groove. Respective O-rings 14a, 14b are provided between the body of the thrust member 11f and the flange thereof, on the one hand, and the peripheral face of the groove, on the other. The axial extent of the greater diameter portion of the stepped peripheral groove exceeds the axial extent of the radial flange 11f' to the thrust member, and the said thrust member 11f is movable axially relative to the groove 13a, within the limits imposed by the end faces of such greater diameter portions.

A bleed passage 15 is provided extending from the closed annular space 16 defined by and between a gland block assembly 17 which defines the groove 13a and the inner annular end-face of the flange 11f', the said passage 15 being in fluid flow connection with an outlet, such outlet being a further passage connected to atmosphere or simply that passage arrangement defined by the working tolerances between the gland block assembly and the cylindrical block, as preferred.

The outer annular end face 11f'' of the thrust member 11f lies in spaced apart disposition relative to the adjacent annular end wall 13a' of the groove, whilst the inner end face 11f''' of such member is provided with radial flutings, or the like, to provide for passage of fluid to the region of the sealing ring 14a for lubrication purposes, fluid reaching the other sealing ring 14b by passage between the opposed end faces of the thrust member and end wall of the groove, 11f'' and 13a' respectively.

The arrangement is completed by a circlip engaged with a suitable recess in the gland body assembly, such circlip serving to hold the various elements of plurality of parts captive on the gland body assembly prior to fitting the same in position in the cylinder.

In operation, the pressure of the fluid being sealed is applied to the free annular end face 11f'' of the thrust member 11f, and, having regard to the relative areas of the two ends of the thrust member, serves to load the member towards the abutting annular gland parts 11a to 11d to urge the sealing ring 11a into sealing contact with the gland body 17 and the surface of the piston 12, the load on the seal increasing with increasing fluid pressure within the cylinder.

The invention is not restricted to the exact features of the embodiment hereinbefore described, since alternatives will readily present themselves to one skilled in the art. Thus, for example, whilst we prefer to provide a bleed passage to prevent restraint due to pressure build-up in the annular space 16 behind the radial flange to the thrust member, the provision of such a means is not essential and may be omitted if preferred.

It is to be borne in mind that although we have described and illustrated an arrangement wherein the sealing ring operates against an element disposed radially inwardly thereof, the alternative arrangement wherein the sealing ring operates radially outwardly is equally feasible.

The gland arrangement as herein proposed has a variety of applications, but such arrangement is ideally suited to fluid spring applications.

What we claim is:

1. A gland seal arrangement for providing a fluid-tight seal between two relatively movable parts (12, 17), the said arrangement comprising an annular sealing member (11a) for disposal between said parts (12, 17) in sealing contact therewith, the said member (11a) being axially locatable in one said part (12, 17), and a thrust member (11f) arranged to act axially upon the said sealing member (11a), the said thrust member (11f) having a face (11f'') for exposure to the pressure of the fluid being sealed and being adapted, when subjected to such pressure, to urge the sealing member into such sealing contact.

2. A gland seal arrangement as claimed in claim 1, wherein the annular sealing member (11a) is supported by and between two coaxially arranged anti-extrusion rings (11b, 11c).

3. A gland seal arrangement as claimed in claim 1, wherein an abutment is provided towards which the thrust member (11f) is adapted to be loaded by the pressure to be sealed when applied to the said face (11*f*″).

4. A gland seal arrangement as claimed in claim 3, wherein the thrust member (11*f*) is of generally cylindrical form, that end thereof remote from the sealing member having a radially outwardly directed flange (11*f*′) the end face of which defines the face (11*f*″) aforesaid, that face of the flange directed towards the sealing ring (11*a*) being isolated from the pressure of the fluid being sealed.

5. A gland seal arrangement as claimed in claim 4, wherein the elements (11*a* to 11*f*) thereof are disposed in a stepped peripheral groove (13*a*), the radial flange (11*f*′) of the thrust member (11*f*) being positioned for limited axial movement within a larger diameter portion of such groove with the outer end 11*f*″ face of the flange exposed to the pressure of the fluid being sealed, the said flange being in sealed relationship with the bottom of the groove about the periphery of such flange.

6. A gland seal arrangement as claimed in claim 5, wherein the thrust member (11*f*) is in sealed relationship with the bottom of the lesser diameter part of the stepped groove (13*a*) and that space (16) behind the radial flange and the opposed step between the lesser and larger diameter parts of the groove is provided with a bleed passage (15) for relieving the pressure therein.

7. A gland seal arrangement as claimed in claim 5, wherein that end of the thrust member (11*f*) adjacent the sealing member (11*a*) is provided with radial flutings for passage of the fluid to the region of the seal between the thrust member (11*f*) and the lesser diameter part of the stepped groove (13*a*).

8. A gland seal arrangement as claimed in claim 5, further including a gland block (17) upon which the stepped peripheral groove (13*a*) is formed, the sealing member being captively located on the said block by a circlip engaged therewith.

9. A gland seal arrangement as claimed in claim 1, wherein the sealing ring (11*a*) is arranged for co-operation with a relatively movable part (12) disposed radially inwardly thereof.

10. A gland seal arrangement as claimed in claim 1, in combination with a structure having relatively movable parts (12,13) between which a fluid seal is to be effected, the arrangement being mounted on one such part (12,13) for sealing contact with the other such part (13,12).

* * * * *